United States Patent [19]

Ogura

[11] Patent Number: 5,047,643
[45] Date of Patent: Sep. 10, 1991

[54] RADIATION IMAGE READ-OUT APPARATUS

[75] Inventor: Nobuhiko Ogura, Kanagawa, Japan

[73] Assignee: Fuji Photo Film Co., Ltd., Kanagawa, Japan

[21] Appl. No.: 667,357

[22] Filed: Mar. 8, 1991

Related U.S. Application Data

[63] Continuation of Ser. No. 409,543, Sep. 19, 1989, abandoned.

[30] Foreign Application Priority Data

Sep. 19, 1988 [JP] Japan .................. 63-233987

[51] Int. Cl.⁵ .................................... G03B 42/00
[52] U.S. Cl. .......................... 250/327.2; 250/484.1
[58] Field of Search ..................... 250/327.2, 484.1

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 382/6 |
| 4,387,428 | 6/1983 | Ishida et al. | 364/413.13 |
| 4,651,220 | 3/1987 | Hosoi et al. | 358/471 |
| 4,886,968 | 12/1989 | Ohnishi et al. | 250/327.2 |
| 4,945,238 | 7/1990 | Muraishi | 250/327.2 |

FOREIGN PATENT DOCUMENTS 52-16123 2/1977 Japan.
56-11395 2/1981 Japan.
59-13235 7/1984 Japan.

Primary Examiner—Constantine Hannaher
Assistant Examiner—Jacob M. Eisenberg
Attorney, Agent, or Firm—Sughrue, Mion, Zinn, Macpeak & Seas

[57] ABSTRACT

A radiation image read-out apparatus comprises a sheet holding device for holding a stimulable phosphor sheet on a cylindrical surface, and a spinner having a deflection mirror for reflecting stimulating rays coming from a semi-transparent mirror to the stimulable phosphor sheet, and a condensing lens which converges the reflected stimulating rays on the stimulable phosphor sheet and which has equal focal lengths with respect to stimulating rays and light emitted by the stimulable phosphor sheet. The deflection mirror and the condensing lens rotate together to scan the stimulating rays on the stimulable phosphor sheet in a main scanning direction, which sheet is moved in a sub-scanning direction. A detection lens converges the emitted light, which has passed through the condensing lens and comes from the semi-transparent mirror. An aperture plate allows only the emitted light after being thus converged to pass therethrough, and a photodetector is positioned at the rear of the aperture plate to detect the emitted light.

5 Claims, 5 Drawing Sheets

RADIATION IMAGE READ-OUT APPARATUS

This is a Continuation of Application No. 07/409,543 filed Sept. 19, 1989, now abandoned.

BACKGROUND OF THE INVENTION

1. Field of the Invention

This invention relates to a radiation image read-out apparatus wherein a stimulable phosphor sheet carrying a radiation image stored thereon is scanned with stimulating rays which cause the stimulable phosphor sheet to emit light in proportion to the amount of energy stored thereon during exposure to radiation, and the emitted light is photoelectrically detected in order to read out the radiation image. This invention particularly relates to a radiation image read-out apparatus wherein a stimulable phosphor sheet is held on a concave cylindrical surface and scanned with stimulating rays radiated from a rotating member which rotates around the center axis of the concave cylindrical surface.

2. Description of the Prior Art

When certain kinds of phosphors are exposed to radiation such as X-rays, α-rays, β-rays, γ-rays, cathode rays or ultraviolet rays, they store part of the energy of the radiation. Then, when the phosphor which has been exposed to radiation is exposed to stimulating rays such as visible light, light is emitted by the phosphor in proportion to the amount of energy stored thereon during exposure to the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as a human body in order to store a radiation image of the object thereon, and is then scanned with stimulating rays such as a laser beam which cause it to emit light in proportion to the amount of energy stored during exposure to radiation. The light emitted by the stimulable phosphor sheet upon stimulation thereof is photoelectrically detected and converted into an electric image signal, and the electric image signal is used to reproduce the radiation image of the object as a visible image on a recording material such as photographic film, a display device such as a cathode ray tube (CRT), or the like.

Stimulable phosphor sheets are used as a means for recording radiation images mainly in the field of medicine, but they may be used in various other fields as well. For example, the applicant proposed in U.S. Pat. No. 4,651,220 and U.S. Pat. No. 4,889,990 novel methods for recording and reproducing an electron microscope image wherein a stimulable phosphor sheet is utilized. Basically, the proposed methods for recording and reproducing an electron microscope image comprises the steps of (i) exposing a stimulable phosphor sheet for storing electron beam energy thereon to an electron beam which has passed through a sample in a vacuum in order to store the electron beam energy on the stimulable phosphor sheet, (ii) thereafter exposing the stimulable phosphor sheet to, for example, stimulating rays to release the stored energy as emitted light, (iii) photoelectrically detecting the emitted light to obtain an image signal, and (iv) using the image signal in order to reproduce an electron beam image of the sample.

It is desirable that a read-out apparatus, which is used for the aforesaid electron microscope image recording and reproducing methods in order to irradiate the stimulating rays to the stimulable phosphor sheet and to detect the light emitted by the stimulable phosphor sheet, be capable of scanning the stimulating rays at a higher density than the density at which the read-out apparatus for the aforesaid systems for recording and reproducing the radiation image of a human body or the like scans stimulating rays. Also, it is desirable that the former read-out apparatus be capable of detecting recorded images at a higher accuracy than the accuracy at which the latter read-out apparatus detects recorded images. In order to satisfy the aforesaid requirements, a novel radiation image read-out apparatus has been proposed in Japanese Unexamined Patent Publication No. 59(1984)-13235. The proposed radiation image read-out apparatus comprises an optical element, such as a dichroic mirror, which reflects or transmits stimulating rays and transmits or reflects light emitted by a stimulable phosphor sheet, and which is positioned between a light source and the stimulable phosphor sheet. The proposed radiation image read-out apparatus also comprises a condensing element (lens) for converging the stimulating rays, which come from the optical element, onto the stimulable phosphor sheet. The stimulable phosphor sheet is formed cylindrically and rotated to carry out scanning in the main scanning direction. In the proposed radiation image read-out apparatus, the light emitted by the stimulable phosphor sheet passes through the condensing lens from the direction reverse to the direction along which the stimulating rays pass through the condensing lens. The light emitted by the stimulable phosphor sheet is collimated by the condensing lens 23, and the collimated light passes through or is reflected by the dichroic mirror. The collimated light is then converged by a converging lens and detected by a photodetector. With the proposed radiation image read-out apparatus, an optical element having a short focal length can be used as the aforesaid condensing element, and the stimulating rays can be converged to a small spot diameter. Also, the light emitted by the stimulable phosphor sheet is condensed by the condensing lens and the converging lens, and therefore no shading arises as in cases where a large light guide member is used.

Also, a different type of an image read-out apparatus is disclosed in Japanese Unexamined Patent Publication No. 52(1977)-16123. In the disclosed image read-out apparatus, a recording medium is held cylindrically (on a concave cylindrical surface) and is kept stationary. The recording medium is scanned with a light beam radiated from a rotating member which rotates around the center axis of the concave cylindrical surface. The light beam serving as a reading light is caused to scan with respect to the recording medium, and light reflected from the recording medium is detected in order to read out the image information recorded on the recording medium. Such a scanning system is also applicable when light emitted by a stimulable phosphor sheet is detected in order to read out a radiation image stored on the stimulable phosphor sheet. In such cases, as in the cases of the radiation image read-out apparatus proposed in Japanese Unexamined Patent Publication No. 59(1984)-13235, stimulating rays can be converged to a small spot diameter, and shading can be prevented from occurring.

However, in cases where a stimulable phosphor sheet is held on a concave cylindrical surface and scanned with stimulating rays radiated from a rotating member which rotates around the center axis of the concave cylindrical surface, if the optical axis of a laser beam serving as stimulating rays deviates in parallel from the center axis of the cylindrical surface due to, for example, pointing of a laser beam source, the efficiency with which the light emitted by the stimulable phosphor sheet is detected will fluctuate among the positions at which the stimulable phosphor sheet is scanned with the laser beam in the main scanning direction, and shading will arise. The problem will be described hereinbelow with reference to FIG. 5 which is a partial plan view showing the conventional radiation image read-out apparatus.

With reference to FIG. 5, a stimulable phosphor sheet 70 is held with a recording surface thereof facing a center axis L so that the stimulable phosphor sheet 70 is cylindrical around the center axis L. Both edges of the stimulable phosphor sheet 70 are denoted by 70L and 70R. A deflection mirror 71 rotates around the center axis L. Stimulating rays 72 such as a laser beam advance along the center axis L, and is reflected by the deflection mirror 71 to the stimulable phosphor sheet 70. A condensing lens 73 is combined integrally with the deflection mirror 71, and the stimulating rays 72 are converged by the condensing lens 73 onto the stimulable phosphor sheet 70. When the stimulable phosphor sheet 70 is exposed to the stimulating rays 72, the exposed portion of the sheet emits light 74 in proportion to the amount of energy stored thereon during exposure to radiation. The emitted light 74 is collimated by the condensing lens 73 and advances along the optical path of the stimulating rays 72 in the direction reverse to the direction along which the stimulating rays 72 advance. The emitted light 74 is separated by an optical element 75, which is constituted by a dichroic mirror or the like, from the optical path of the stimulating rays 72. The emitted light 74 is then converged by a detection lens 76, and detected by a photodetector 77. In order to keep the sharpness of the read-out image high, an aperture plate 78 which allows only the emitted light 74, after being converged by the detection lens 76, to pass therethrough is positioned in front of the photodetector 77.

In cases where the optical axis of the stimulating rays 72 coincides exactly with the center axis L, the stimulating rays 72 scan the stimulable phosphor sheet 70 along a straight scanning line H. However, in cases where the optical axis of the stimulating rays 72 deviates in parallel from the center axis L as indicated by the broken line, the stimulating rays 72 scan the stimulable phosphor sheet 70 along a bent scanning line J. Specifically, when the stimulating rays 72 are reflected by the deflection mirror 71 to the upper side in FIG. 5, they advance along the direction indicated by the arrow K. When the stimulating rays 72 are reflected by the deflection mirror 71 to the lower side in FIG. 5, they advance along the direction indicated by the arrow M.

In order to collimate the emitted light 74, the condensing lens 73 is spaced by a distance equal to the focal length f (with respect to the emitted light 74) from the stimulable phosphor sheet 70. In the strict sense, because the wavelengths of the stimulating rays 72 are different from the range of wavelengths of the emitted light 74, the stimulating rays 72 are converged by the condensing lens 73 to a position slightly deviated from the surface of the stimulable phosphor sheet 70. Even in such cases, if the optical axis of the stimulating rays 72 always coincides with the center axis L, the optical axis of the emitted light 74 after being converged by the detection lens 76 will not deviate from the center of the aperture of the aperture plate 78. However, when the position at which the stimulating rays 72 are converged deviates from the surface of the stimulable phosphor sheet 70 and the optical axis of the stimulating rays 72 deviates from the axis of the condensing lens 73, the optical axis of the emitted light 74 after being converged by the detection lens 76 deviates as shown in FIG. 6 from the center of the aperture of the aperture plate 78. The extent to which the optical axis of the emitted light 74 after being converged by the detection lens 76 deviates from the center of the aperture of the aperture plate 78 fluctuates depending on the extent to which the optical axis of the stimulating rays 72 deviates from the axis of the condensing lens 73. Therefore, the amount of the emitted light 74 which passes through the aperture of the aperture plate 78 and is detected by the photodetector 77 fluctuates as the position changes at which the stimulable phosphor sheet 70 is scanned with the stimulating rays 72 in the main scanning direction.

SUMMARY OF THE INVENTION

The primary object of the present invention is to provide a radiation image read-out apparatus which is of a cylindrical scanning type and wherein the accuracy with which a radiation image is read out is prevented from deteriorating due to shading.

Another object of the present invention is to provide a radiation image read-out apparatus which is also suitable as an apparatus for reading out an electron microscope image.

The present invention provides a radiation image read-out apparatus wherein a stimulable phosphor sheet carrying a radiation image stored thereon is scanned with stimulating rays which cause the stimulable phosphor sheet to emit light in proportion to the amount of energy stored thereon during exposure to radiation, and the emitted light is photoelectrically detected in order to read out the radiation image, the radiation image read-out apparatus comprising:
  i) a sheet holding means for holding said stimulable phosphor sheet thereon in a cylindrical surface form,
  ii) a stimulating ray source for producing said stimulating rays,
  iii) a semi-transparent mirror which is provided in an optical path of said stimulating rays and which transmits one of said stimulating rays and said light emitted by said stimulable phosphor sheet and reflects the other thereof,
  iv) a spinner provided with:
    a) a deflection mirror which reflects said stimulating rays coming from said semi-transparent mirror toward said stimulable phosphor sheet, said reflection being effected on the center axis of said cylindrical surface, and
    b) a condensing lens which is positioned in the optical path of said stimulating rays reflected by said deflection mirror in order to converge said stimulating rays on said stimulable phosphor sheet, and which has substantially equal focal lengths with respect to said stimulating rays and said light emitted by said stimulable phosphor sheet, said spinner rotating said deflection mirror and said condensing lens together coaxially with respect to said center axis, thereby to scan said stimulating rays in a main scanning direction on said stimulable phosphor sheet, v) a sub-scanning means for moving said sheet holding means with respect to said spinner in parallel with said center axis, vi) a detection lens provided in an optical path of said light emitted by said stimulable phosphor sheet, which light has passed through said condensing lens and comes from said semi-transparent mirror, in order to converge said emitted light, vii) an aperture plate which is provided at a position where said emitted light is converged by said detection lens, and which has an aperture of a size allowing only said emitted light after being thus converged to pass therethrough, and viii) a photodetector provided at the rear of said aperture plate.

In cases where the condensing lens is located so that it focuses the stimulating rays on the stimulable phosphor sheet, the light emitted by the stimulable phosphor sheet is collimated by the condensing lens when the light passes through the condensing lens. Also, in cases where the condensing lens is located so that it focuses the stimulating rays on the stimulable phosphor sheet, the stimulating rays are converged at the focal point of the condensing lens even when the optical axis of the stimulating rays deviates in parallel from the center axis of the cylindrical surface, i.e. even when the optical axis of the stimulating rays deviates from the axis of the condensing lens. As a result, the position at which the stimulating rays are converged, i.e. the position at which light is emitted by the stimulable phosphor sheet, is constant with respect to the position of the condensing lens. Therefore, the position of the optical axis of the light emitted by the stimulable phosphor sheet is constant with respect to the aperture of the aperture plate, and no shading occurs.

With the radiation image read-out apparatus in accordance with the present invention, the condensing lens which has substantially equal focal lengths with respect to the stimulating rays and the light emitted by the stimulable phosphor sheet is used in order to converge the stimulating rays and to collimate the light emitted by the stimulable phosphor sheet. Therefore, even when the optical axis of the stimulating rays deviates from the center of rotation of the deflection mirror, it is possible to prevent shading from occurring and to keep the accuracy, with which radiation images are read out, substantially high.

Also, with the radiation image read-out apparatus in accordance with the present invention, the focal length of the condensing lens is kept short, and therefore radiation images can be read out at a high density. Furthermore, no shading occurs because the light emitted by the stimulable phosphor sheet is condensed by the condensing lens and the detection lens. Moreover, since the light emitted by the stimulable phosphor sheet is detected after passing through the aperture of the aperture plate, radiation images can be read out accurately with a large S/N ratio and a high sharpness. Therefore, the radiation image read-out apparatus in accordance with the present invention is also suitable as an apparatus for reading out electron microscope images.

DESCRIPTION OF THE PREFERRED EMBODIMENTS

The present invention will hereinbelow be described in further detail with reference to the accompanying drawings.

Figure 1:
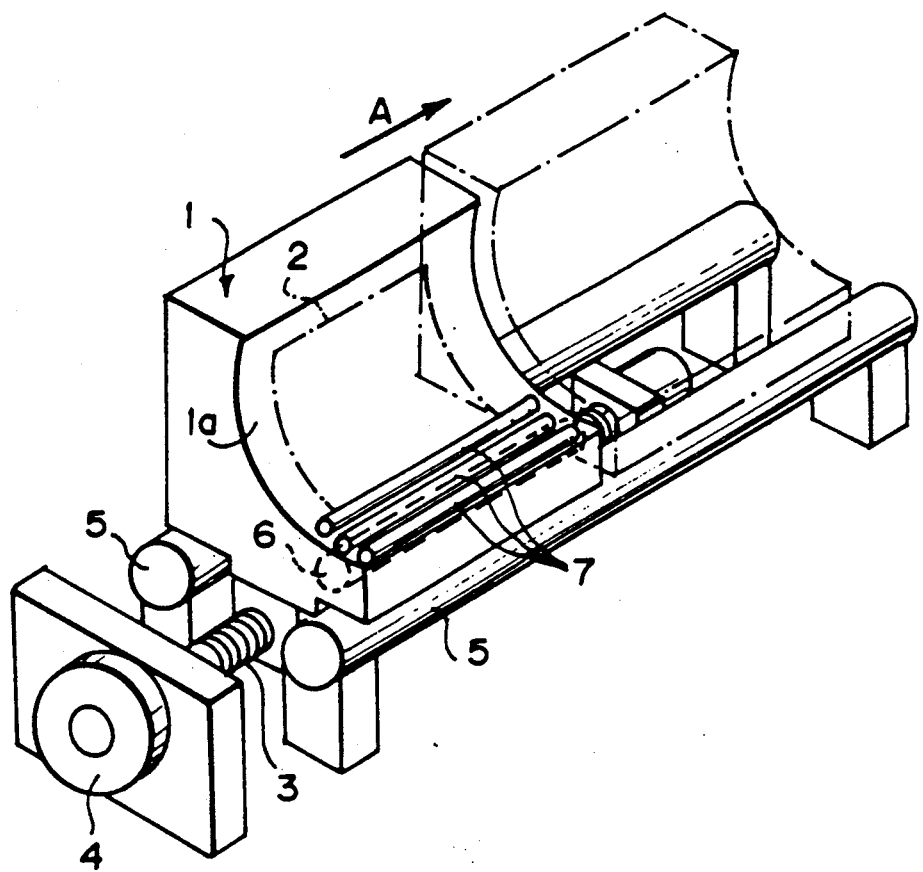
FIG. 1 is a perspective view showing the sheet holding means and the sub-scanning means in an embodiment of the radiation image read-out apparatus in accordance with the present invention.

With reference to FIG. 1, a platen 1 as a sheet holding means has a concave cylindrical surface 1a, and a drive roller 6 and rollers 7, 7, 7 are provided close to the lower edge portion of the cylindrical surface 1a. A stimulable phosphor sheet 2 carries a radiation image stored thereon by, for example, being exposed to radiation, which has passed through an object such as a human body, or to an electron beam which has passed through a sample in an electron microscope. The stimulable phosphor sheet 2 is conveyed by a known sheet conveyance means (not shown), and the leading edge of the sheet 2 is fed to the lower part of the platen 1. Then, the drive roller 6 is rotated to feed the sheet 2 to a predetermined position along the cylindrical surface 1a. In this manner, the stimulable phosphor sheet 2 is held as indicated by the chained line in FIG. 1 on the platen 1. The lower part of the platen 1 is engaged with the screw rod 3 which is rotated by the motor 4 to move the platen 1 at a predetermined speed in the direction indicated by the arrow A along the two guide rails 5, 5 between the position indicated by the solid lines in FIG. 1 and the position indicated by the chained line. In this embodiment, the sub-scanning means is constituted of the screw rod 3, the motor 4 and the guide rails 5, 5.

Figure 2:
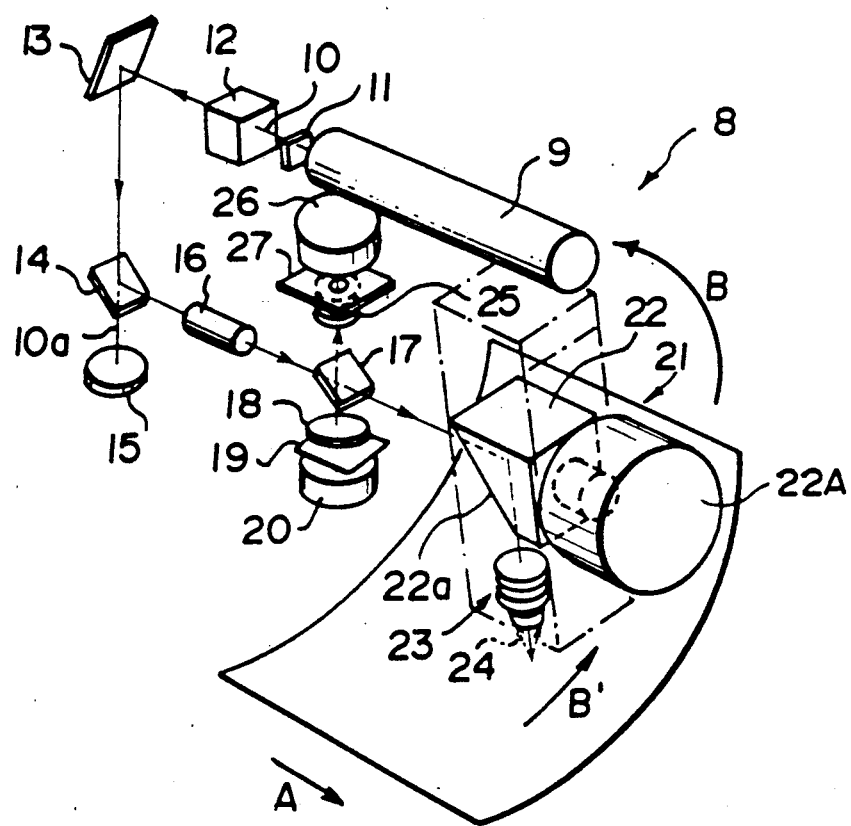
FIGS. 2 and 3 are a perspective view and a front view showing the scanning optical system in the embodiment shown in FIG. 1.
Figure 3:
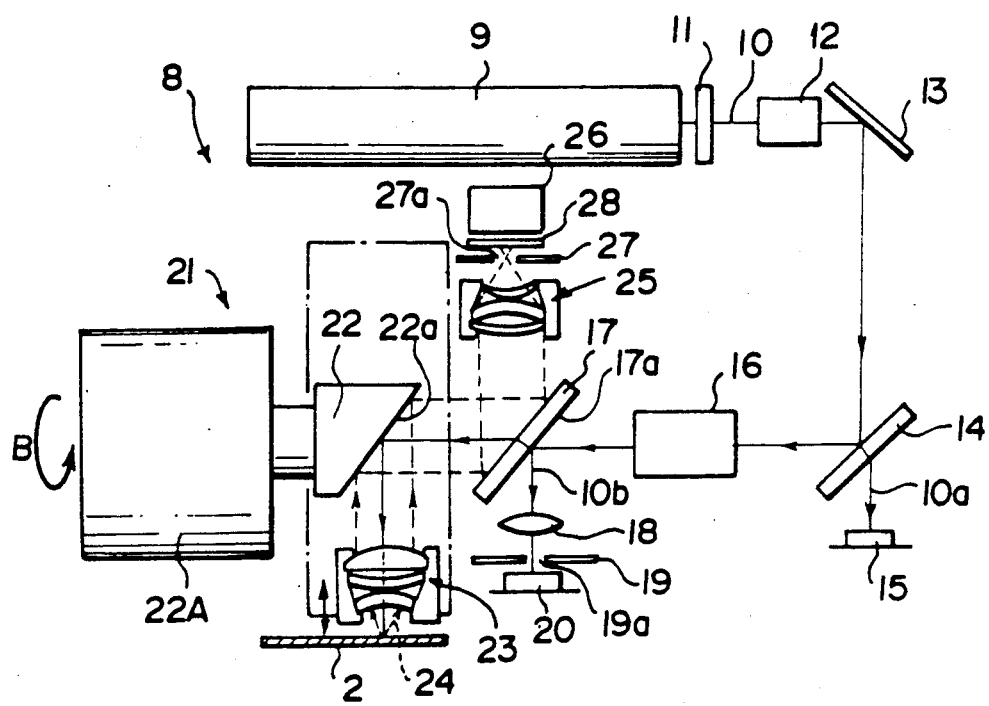

A scanning optical system 8 as shown in FIGS. 2 and 3 is provided above the platen 1, and the image stored on the stimulable phosphor sheet 2 is read out by the scanning optical system 8. In the scanning optical system 8, a laser beam 10 is produced by a He-Ne laser 9 acting as a source for the stimulating rays. The laser beam 10 is passed through a filter 11 for filtering out light of unnecessary wavelengths, passed through an acousto-optic modulator (AOM) 12 for adjusting the intensity of the laser beam 10, and then reflected by mirrors 13 and 14 to change the direction of the optical path. The mirror 14 transmits a predetermined small portion of the incident laser beam 10 as indicated by 10a. The intensity of the laser beam 10a passing through the mirror 14 is detected by a photodetector 15. The photodetector 15 controls the AOM 12 in accordance with the detected intensity of the laser beam 10a so that the intensity of the laser beam 10 radiated by the AOM 12 is kept constant.

The portion of the laser beam 10 reflected by the mirror 14 is passed through a beam expander 16 for expanding the beam diameter of the laser beam 10 to a predetermined value, and then impinges upon a dichroic mirror 17 which transmits light having wavelengths within the range of wavelengths of the laser beam 10 and reflects light having wavelengths within the range of wavelengths of the light emitted by the stimulable phosphor sheet 2 when the stimulable phosphor sheet 2 is stimulated by the laser beam 10. The dichroic mirror 17 has a laser beam input face 17a, surface-treated so that it reflects a very small portion of the incident laser beam 10 as indicated by 10b. The laser beam 10b reflected by the laser beam input face 17a is converged by a converging lens 18, passes through an aperture 19a of an aperture plate 19, and is detected by a photodetector 20. The photodetector 20 detects the position of incidence of the laser beam 10b, thereby determining whether the optical axis of the laser beam 10 has a predetermined direction, and generates a signal for fine adjustment of the positions of the mirrors 13 and 14.

The laser beam 10 passing through the dichroic mirror 17 impinges upon a spinner 21 provided in the optical path of the laser beam 10, and is reflected and deflected thereby. The spinner 21 continuously and quickly rotates a deflection mirror 22 with a spindle motor 22A in the direction indicated by the arrow B. The deflection mirror 22 is provided with a reflection surface 22a inclined at an angle of 45° with respect to the incident laser beam 10. The deflection mirror 22 is provided to reflect the laser beam 10 on the center axis of the cylindrical surface 1a of the platen 1, so that the length of the optical path of the laser beam 10 from the point of reflection to the point where it hits the stimulable phosphor sheet 2 is constant. A condensing lens 23 for converging the laser beam 10 incident as a collimated light beam to a spot having a desirable diameter on the stimulable phosphor sheet 2 is provided in the optical path of the laser beam 10 reflected and deflected by the deflection mirror 22. The condensing lens 23 is rotated together with the deflection mirror 22 since it is part of the spinner 21. The laser beam 10 is reflected and deflected by the spinner 21 to scan the stimulable phosphor sheet 2 repeatedly in the main scanning direction, indicated by the arrow B' in FIG. 2. At the same time, as mentioned above, the platen 1 is moved at a predetermined speed in the sub-scanning direction indicated by the arrow A. Therefore, the stimulable phosphor sheet 2 is two-dimensionally scanned by the laser beam 10. The condensing lens 23 can be provided close to the stimulable phosphor sheet 2 without the diameter thereof being increased. Therefore, a lens having a short focal length can be used as the condensing lens 23, thereby to converge the laser beam 10 to a very small spot diameter and to carry out the image readout from the stimulable phosphor sheet 2 at a high resolution.

In this embodiment, the wavelength of the laser beam 10 is 632.8 nm. As the stimulable phosphor sheet 2 is exposed to the laser beam 10, the exposed portion of the stimulable phosphor sheet 2 emits light 24 in an amount proportional to the amount of energy stored on said portion during exposure to radiation. The wavelength of the light 24 emitted by the stimulable phosphor sheet 2 is 390 nm. The light 24 is emitted as non-directional light by said exposed portion of the stimulable phosphor sheet 2, and is collimated by the condensing lens 23 spaced by a distance equal to the focal length f from said exposed portion of the stimulable phosphor sheet 2. Then, the emitted and collimated light 24 is reflected by the deflection mirror 22 of the spinner 21 and by the dichroic mirror 17. A detection lens 25 for converging the emitted light 24 is provided in the optical path of the emitted light 24 reflected by the dichroic mirror 17. The emitted light 24 is converged by the detection lens 25, and impinges upon a photomultiplier 26. An aperture plate 27 having an aperture 27a of a size that allows only the emitted light 24 carrying the image information to pass therethrough is provided at the position of convergence of the emitted light 24 by the detection lens 25. Specifically, when part of the laser beam 10 impinging upon the stimulable phosphor sheet 2 is reflected by the sheet surface, and the reflected laser beam impinges upon elements in the apparatus such as the condensing lens 23 and is reflected by these elements back to the stimulable phosphor sheet 2 but not to the predetermined position of laser beam irradiation, light is undesirably emitted by portions of said sheet stimulated when the laser beam is reflected back to said sheet. However, the light thus emitted by said sheet portions passes through the condensing lens 23 and the detection lens 25, and is guided to positions different from the position to which the light 24 emitted by the predetermined position on the stimulable phosphor sheet 2 is guided. Therefore, the light thus emitted by said sheet portions is intercepted by the aperture plate 27, and is prevented from impinging upon the photomultiplier 26. In this manner, with the embodiment wherein the aperture plate 27 is provided, the light emitted by the stimulable phosphor sheet 2 when it is exposed to reflected stimulating rays and stimulating rays scattered in the stimulable phosphor sheet 2 can be cut off, and image readout can be carried out accurately.

The laser beam 10 reflected by the stimulable phosphor sheet 2 and passing through the condensing lens 3 will often pass through the aperture 27a of the aperture plate 27 together with the light 24 emitted by the stimulable phosphor sheet 2. To eliminate this problem, a filter 28 for selectively transmitting only light having a wavelength within the wavelength range of the emitted light 24 is provided on the light receiving face of the photomultiplier 26, thereby to filter out the laser beam 10 passing through the aperture 27a. The photomultiplier 26 photoelectrically detects the emitted light 24 and generates a read-out image signal. The read-out image signal is processed in an image processing circuit (not shown). The processed image signal is fed into an image reproducing apparatus (not shown) constituted of, for example, a CRT or a light beam scanning recording apparatus, and is used to reproduce the radiation image as a visible image on the CRT or as a hard copy.

By the time the image read-out operation is finished, the platen 1 has moved to the position indicated by the chained line in FIG. 1, and stops at this position. Thereafter, the direction of rotation of the roller 6 is reversed in order to move the stimulable phosphor sheet 2 from the platen 1 to a sheet conveyance system (not shown).

Figure 4:
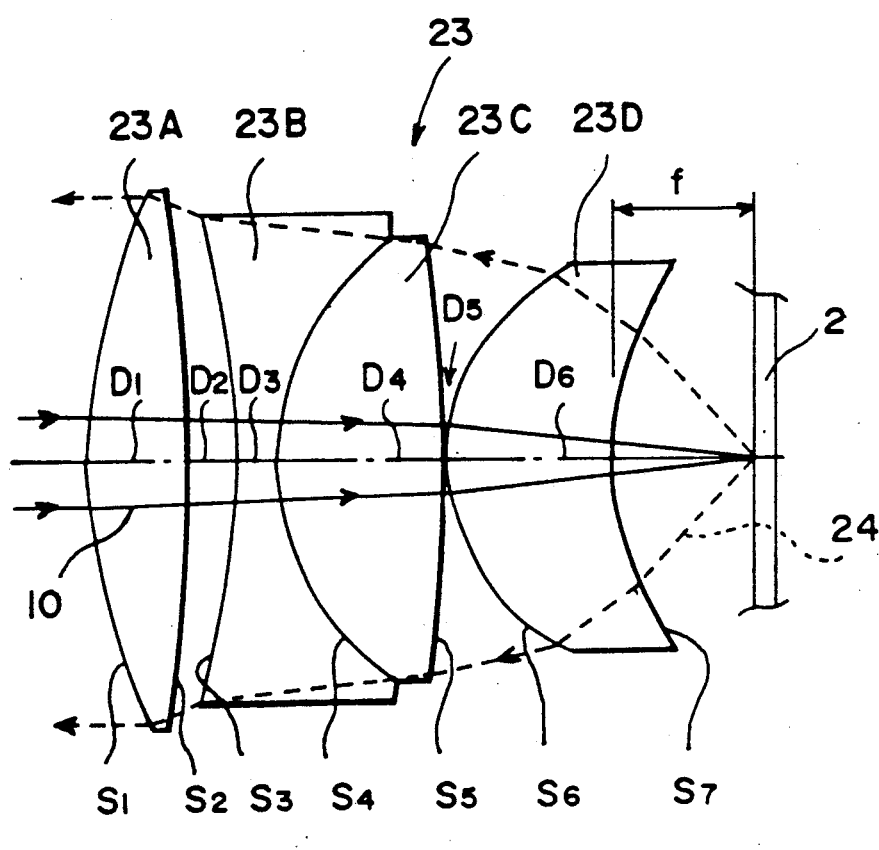
FIG. 4 is a sectional view showing the condensing lens employed in the embodiment shown in FIG. 1.
Figure 5:
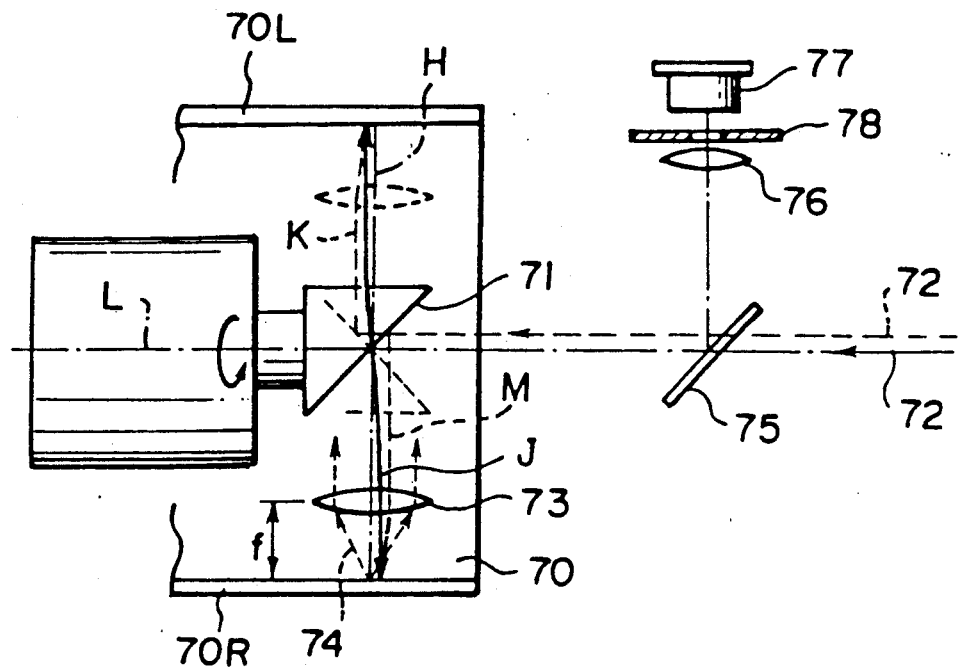
FIG. 5 is a partial plan view showing a conventional radiation image read-out apparatus.
Figure 6:
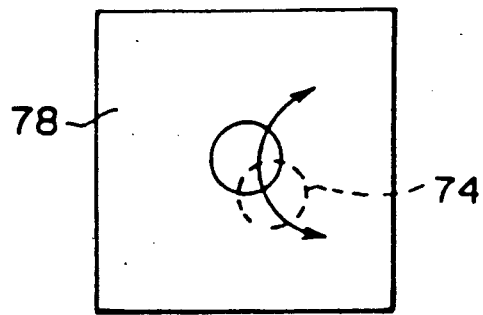
FIG. 6 is an explanatory view showing how shading occurs.

The configuration of the condensing lens 23 will hereinbelow be described in detail with reference to FIG. 4. The condensing lens 23 is composed of spherical lenses 23A, 23B, 23C and 23D. The medium present around the spherical lenses 23A, 23B, 23C and 23D is air. Table below shows radii of curvature R1 through R7 of surfaces S1 through S7 of the spherical lenses 23A, 23B, 23C and 23D, distances D1 through D6 between adjacent surfaces, and refractive indices $N_{\lambda=390}$ and $N_{\lambda=632.8}$ of media with respect to the light 24 emitted by the stimulable phosphor sheet 2 (wavelength: 390 nm) and the laser beam 10 (wavelength: 632.8 nm). (The unit of length is mm). In the table, refractive indices for the media associated with the distances Dk (k=1, 2, ..., 6) between adjacent surfaces are listed on the same rows as the corresponding distances Dk.

TABLE

| i | Ri | Di | $N_\lambda = 390$ | $N_\lambda = 632.8$ |
|---|---|---|---|---|
| 1 | 32.400 | 5.300 | 1.78325 | 1.75197 |
| 2 | −120.400 | 3.050 | 1.00000 | 1.00000 |
| 3 | −43.830 | 2.000 | 1.73611 | 0.68445 |
| 4 | 14.800 | 9.300 | 1.64026 | 1.61824 |
| 5 | −81.590 | 0.100 | 1.00000 | 1.00000 |
| 6 | 11.980 | 9.000 | 1.85083 | 1.81235 |
| 7 | 18.000 | | | |

The focal length f (back focus) of the condensing lens 23 is 7.9946 mm with respect to the light 24 emitted by the stimulable phosphor sheet 2 which has a wavelength of 390 nm), and is 8.0284 mm with respect to the laser beam 10 having a wavelength of 632.8 nm. The difference between the focal lengths f for the emitted light 24 and the laser beam 10 is as small as 33.8 μm. The focal lengths of the condensing lens 23 with respect to the emitted light 24 and the laser beam 10 are substantially equal to each other. Therefore, when the condensing lens 23 is located with respect to the stimulable phosphor sheet 2 as shown in FIG. 4, the condensing lens 23 collimates the light 24 emitted by the stimulable phosphor sheet 2 and converges the laser beam 10 to a very small spot on the surface of the stimulable phosphor sheet 2.

Also, even when the optical axis of the laser beam 10 deviates in parallel from the center axis of the cylindrical surface 1a, i.e. from the center of rotation of the spinner 21, so that the optical axis of the laser beam 10 incident upon the condensing lens 23 deviates in parallel from the center axis of the condensing lens 23, the laser beam 10 is converged on the stimulable phosphor sheet 2 at the focal point of the condensing lens 23. As a result, even when the optical axis of the laser beam 10 deviates as described above, the light 24 is emitted at the point which lies on the center axis of the condensing lens 23. Therefore, the position of the optical axis of the emitted light 24 with respect to the aperture 27a of the aperture plate 27 is constant. (Of course, when the center of the aperture 27a and the center axis of the condensing lens 23 match with each other, the optical axis of the emitted light 24 aligns with the center of the aperture 27a.) Accordingly, no shading occurs.

The condensing lens having substantially equal focal lengths with respect to the laser beam 10 serving as stimulating rays and the light 24 emitted by the stimulable phosphor sheet 2 is not limited to the configuration described above. Also, the wavelengths of the stimulating rays and the light emitted by the stimulable phosphor sheet are not limited to those described above. The condensing lens may be designed to be suitable for their wavelengths.

In the aforesaid embodiment, the dichroic mirror 17 is used as the optical element for guiding the laser beam 10 serving as stimulating rays toward the stimulable phosphor sheet 2 and guiding the light 24 emitted by the stimulable phosphor sheet 2 toward the photomultiplier 26 serving as the photodetector. However, in cases where the intensity of the stimulating rays and the intensity of the emitted light 24 are comparatively high, an ordinary semi-transparent mirror may be utilized instead of the dichroic mirror 17. Also, in order to carry out the sub-scanning, instead of the sheet holding means being moved, the overall scanning optical system 8 may be moved. Moreover, the configuration and layout of each optical element of the scanning optical system 8 are not limited to those in the aforesaid embodiment.

I claim:
1. A radiation image read-out apparatus wherein a stimulable phosphor sheet carrying a radiation image stored thereon is scanned with stimulating rays which cause the stimulable phosphor sheet to emit light in proportion to the amount of energy stored thereon during exposure to radiation, and the emitted light is photoelectrically detected in order to read out the radiation image, the radiation image read-out apparatus comprising:
i) a sheet holding means for holding said stimulable phosphor sheet thereon in a cylindrical surface form,
ii) a stimulating ray source for producing said stimulating rays,
iii) a semi-transparent mirror which is provided in an optical path of said stimulating rays and which transmits one of said stimulating rays and said light emitted by said stimulable phosphor sheet and reflects the other thereof,
iv) a spinner provided with:
a) a deflection mirror which reflects said stimulating rays coming from said semi-transparent mirror toward said stimulable phosphor sheet, said reflection being effected on the center axis of said cylindrical surface, and
b) a condensing lens which is positioned in the optical path of said stimulating rays reflected by said deflection mirror in order to converge said stimulating rays as a collimated light on said stimulable phosphor sheet, and which has substantially equal focal lengths with respect to said stimulating rays and said light emitted by said stimulable phosphor sheet, wherein the focal length with respect to said stimulating rays is defined by placing said stimulable phosphor sheet at a position where the collimated light having a wavelength equal to that of said stimulating rays is condensed, and wherein the focal length with respect to said light emitted by said stimulable phosphor sheet is defined by condensing the emitted light at a focal point of the emitted light,
said spinner rotating said deflection mirror and said condensing lens together coaxially with respect to said center axis, thereby to scan said stimulating rays in a main scanning direction on said stimulable phosphor sheet,
v) a sub-scanning means for moving said sheet holding means with respect to said spinner in parallel with said center axis,
vi) a detection lens provided in an optical path of said light emitted by said stimulable phosphor sheet, which light has passed through said condensing lens and comes from said semi-transparent mirror, in order to converge said emitted light,
vii) an aperture plate which is provided at a position where said emitted light is converged by said detection lens, and which an aperture of a size allowing only said emitted light after being thus converged to pass therethrough, and
viii) a photodetector provided at the rear of said aperture plate.

2. An apparatus as defined in claim 1 wherein said semi-transparent mirror is a dichroic mirror.

3. An apparatus as defined in claim 1 wherein said stimulating rays are a laser beam.

4. An apparatus as defined in claim 1 wherein said radiation image is an electron microscope image.

5. An apparatus as defined in claim 1 wherein said condensing lens is composed of a plurality of lenses.

* * * * *